(12) United States Patent
Blumenau et al.

(10) Patent No.: US 6,711,612 B1
(45) Date of Patent: Mar. 23, 2004

(54) SYSTEM FOR FACILITATING THE TRANSFER OF MANAGEMENT INFORMATION FROM A REMOTE MASS STORAGE SUBSYSTEM OVER A SWITCHING FABRIC OR SELECTIVELY OVER A PRIVATE LINK TO A CENTRAL LOCATION FOR SERVICING

(75) Inventors: Steven M. Blumenau, Holliston, MA (US); Erez Ofer, Chestnut Hill, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 09/216,174

(22) Filed: Dec. 18, 1998

(51) Int. Cl.[7] ........................ G06F 15/173; G06F 15/16
(52) U.S. Cl. ........................ 709/223; 709/218; 709/224
(58) Field of Search ............................... 709/223, 224, 709/225, 249, 218, 227; 340/825–825.98; 370/252–254, 315, 401; 714/39, 47, 15

(56) References Cited

U.S. PATENT DOCUMENTS

| | | | | |
|---|---|---|---|---|
| 5,742,762 A | * | 4/1998 | Scholl et al. ............... | 709/223 |
| 5,922,051 A | * | 7/1999 | Sidey ........................ | 709/223 |
| 5,961,594 A | * | 10/1999 | Bouvier et al. ............. | 709/223 |
| 6,112,235 A | * | 8/2000 | Spofford .................... | 709/223 |
| 6,157,623 A | * | 12/2000 | Kerstein .................... | 370/315 |
| 6,175,933 B1 | * | 1/2001 | Cadden ....................... | 714/15 |
| 6,192,034 B1 | * | 2/2001 | Hsieh et al. ................ | 709/223 |
| 6,219,701 B1 | * | 4/2001 | Hirata et al. ............... | 709/223 |
| 6,252,878 B1 | * | 6/2001 | Locklear et al. ............ | 370/401 |
| 6,269,330 B1 | * | 7/2001 | Cidon et al. ................ | 709/224 |
| 6,324,577 B1 | * | 11/2001 | Hirai ......................... | 709/223 |

* cited by examiner

Primary Examiner—Rupal Dharia
Assistant Examiner—Quang Nguyen
(74) Attorney, Agent, or Firm—Robert Kevin Perkins; Leanne J. Fitzgerald; John M. Gunther

(57) ABSTRACT

A management information transfer system is disclosed for use in connection with a network including one or more host computers and a mass storage subsystem interconnected by a plurality of switching nodes, the management information transfer system being configured to transfer processed management information to a management service center located remotely from the network. The management information transfer system includes a management server that is configured to receive management information from the switching nodes, and possibly the host computers, which may be directed to failures or other malfunctions in connection with their operations. The management server is configured to perform a filtering operation in connection with the management information that it receives from the switching nodes using filtering policies that may be established by, for example, a network administrator. The management server enables the mass storage subsystem to, in turn, enable its console to transfer the filtered management information to the management service center to facilitate diagnosis and possible correction of the failures or other malfunctions.

8 Claims, 1 Drawing Sheet

US 6,711,612 B1

SYSTEM FOR FACILITATING THE TRANSFER OF MANAGEMENT INFORMATION FROM A REMOTE MASS STORAGE SUBSYSTEM OVER A SWITCHING FABRIC OR SELECTIVELY OVER A PRIVATE LINK TO A CENTRAL LOCATION FOR SERVICING

FIELD OF THE INVENTION

The invention relates generally to the field of digital computer systems and networks of such computer systems, and more particularly to systems and methods for facilitating the transfer of management information, particularly management information relating to failures or other malfunctions and problems, to a central location for servicing.

BACKGROUND OF THE INVENTION

In modem "enterprise" digital data processing systems, that is, computer systems for use in an office environment in a company, a number of personal computers, workstations, and other devices such as mass storage subsystems, network printers and interfaces to the public telephony rat system, are typically interconnected in a computer network. The personal computers and workstations are used by individual users to perform processing in connection with data and programs that may be stored in the network mass storage subsystems. In such an arrangement, the personal computers/workstations, operating as clients, download the data and programs from the network mass storage subsystems for processing. In addition, the personal computers or workstations will enable processed data to be uploaded to the network mass storage subsystems for storage, to a network printer for printing, to the telephony interface for transmission over the public telephony system, or the like. In such an arrangement, the network mass storage subsystems, network printers and telephony interface operate as servers, since they are available to service requests from all of the clients in the network. By organizing the network in such a manner, the servers are readily available for use by all of the personal computers/workstations in the network.

Such a network may be spread over a fairly wide area, with the personal computers/workstations being interconnected by communication links such as switches and routers which, in turn, are connected to the various devices (that is, the personal computers/workstations, mass storage subsystems, network printers, telephony interfaces and the like) by electrical wires or optic fibers. The switches receive data, in the form of message packets, from the various devices operating as source devices, and direct them to other devices, as destination devices. Some types of devices may operate only as source devices, to generate information for transfer to other devices, or as destination devices, to receive information from other devices, but other types of devices may operate as both source devices and/or destination devices to transfer data to and receive data from other devices in the network.

As networks become more complex, the likelihood that a device, switch or communication link will fail or otherwise malfunction also increases. When a failure or other malfunction occurs, a number of problems can develop, including, for example, reduction in bandwidth and loss and corruption of message packets.

SUMMARY OF THE INVENTION

The invention provides new and improved systems and methods for facilitating the accumulating, filtering and transferring of management information, particularly management information relating to failures or other malfunctions and problems, to a central location for servicing.

In brief summary, a management information transfer system for use in connection with a network including one or more host computers and a mass storage subsystem interconnected by a plurality of switching nodes, is configured to transfer processed management information to a management service center located remotely from the network. The management information transfer system includes a management server that is configured to receive management information from the switching nodes, and possibly the host computers, which may be directed to failures or other malfunctions in connection with their operations. The management server is configured to perform a filtering operation in connection with the management information that it receives from the switching nodes using filtering policies that may be established by, for example, a network administrator. The management server enables the mass storage subsystem to, in turn, enable its console to transfer the filtered management information to the management service center to facilitate diagnosis and possible correction of the failures or other malfunctions.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
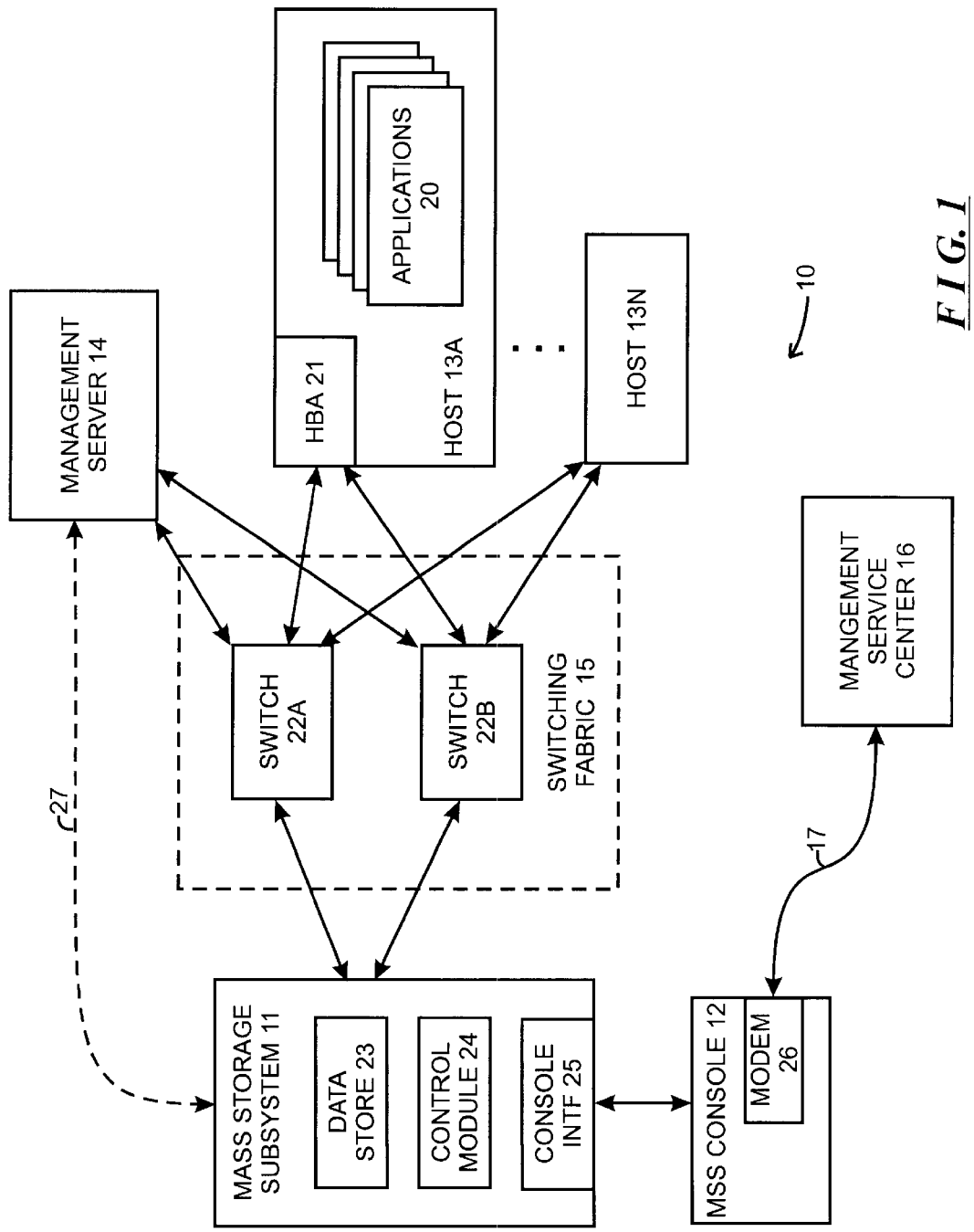
FIG. 1 is a functional block diagram of a network including an arrangement for reporting management information to a central location, constructed in accordance with the invention.

FIG. 1 is a functional block diagram of a network 10 including an arrangement for reporting management information to a central location, constructed in accordance with the invention. Such management information, in one embodiment, includes information as to failures and other malfunctions in connection with various devices connected in the network and programs running thereon, to facilitate diagnosing and possible correction by the central location.

The network 10 includes at least one mass storage subsystem 11 with a console 12 connected thereto, one or more host computers 13A through 13N (generally identified by reference numeral 13n), and a management server 14 all interconnected by a network switching fabric 15. In addition, the arrangement also includes a management service center 16 which may be located a remote site. "In one embodiment, the management service center 16 communicates with the mass storage subsystem's console 12 (refer to as "mss console 12" in FIG. 1) over a public telephony link represented by arrow 17." Each host computer 13n processes application programs, which will be referred to as "applications 20," in connection with data that is stored in mass storage subsystem 11. Each host computer 13n may also provide local storage for data to be processed. Each host computer 13 also provides a number of operating system services, including, for example, providing execution environments such as processes for the applications, transfer and reception of data over the switching fabric 15, connections to the public telephony network, operator input and output services and other services conventional for operating systems to provide to applications 20. Each host computer 13n includes a host bus adapter "HBA" 21 which operates as a network interface to connect the host computer 13n to the switching fabric 15, to facilitate transfer of data, in the form of message packets, to, and the reception of message packets from, other devices, including other host computers 13n' (n'≠n), through the switching fabric 15. The applications 20, and operating system services are in the form of suitable programming executed by the host computer 13 in connection with conventional input/output and other hardware components (not separately shown).

The mass storage subsystem 11 stores data which is available for use by the host computers 13n in their processing operations, as well as processed data which has been provided to the mass storage subsystem 11 for storage. In one embodiment the mass storage subsystem 11 is similar to the mass storage subsystem disclosed in U.S. patent application Ser. No. **[identify Symmetrix patent applications]. Generally, the mass storage subsystem 11 includes a data store 23, a control module 24 and a console interface 25. The data store provides mass storage for data which may be retrieved by the host computers 13n for processing, and for processed data provided by the host computers 13n for storage. In one embodiment, the data store 23 includes one or more disk storage devices, caches and buffers for buffering data that has been retrieved from the disk storage devices for transfer to the host computers 13n as well as data that has been provided by the host computers 13n for storage on the disk storage devices. The control module 24 also provides a bus adapter (not separately shown) which operates as an interface to connect the mass storage subsystem 11 to the switching fabric 15 to facilitate transfer of message packets to and reception of message packets from other devices, including the host computers 13n and management server 14, through the switching fabric 15.

The console interface 25 provides an interface to the mass storage subsystem console 12. The console 12 provides an arrangement by which a system administrator can initialize and configure the mass storage subsystem 11, in a conventional manner. In addition, as will be described below in greater detail, the console 12 provides an arrangement, including a modem 26 and suitable programming, by which the mass storage subsystem 11 can transmit notifications of failures or other malfunctions in connection with its (that is, the mass storage subsystem's) operations to a management service center 16 over the public telephony link 17. The mass storage subsystem 11 may provide such notifications to the management service center to, for example, facilitate diagnosis and possible correction of the failure or other malfunction by the management service center 16.

The switching fabric 15 includes a plurality of switching nodes, represented by switching nodes 22A and 22B (generally identified by reference numeral 22m) which connect to the mass storage subsystem 11 and host computers 13n to facilitate transmission of data, in the form of message packets, thereamong. Although only two switching nodes 22A and 22B are illustratively depicted in FIG. 1, it will be appreciated that the switching fabric 15 may include only one switching node, or more than two switching nodes, and that the switching nodes may be interconnected in a mesh. It will be appreciated, however, that a minimum of two switching nodes 22A and 22B provides for redundancy so that, if one switching node 22A or 22B were to fail or otherwise malfunction, the other switching node 22B or 22A will be available for message packet transmission. The switching nodes 22m are connected to the host computers 13n, to the mass storage subsystem 11, and, if connected in a mesh, other switching nodes, over communication links represented by arrows, which may be in the form of, for example, optical fibers, wires, or any convenient information transfer medium. In one embodiment, the host computers 13n, switching nodes 22m and mass storage subsystem 11 transfer message packets using the well-known Fibre Channel communication standard.

The host computers 13n, to obtain data from the mass storage subsystem 11 for processing, can generate message packets containing data retrieval requests for transmission to the mass storage subsystem 11 over the communication links and through respective switching nodes 22m of the switching fabric 15. After the mass storage subsystem 11 receives the message packets containing the data retrieval requests, it will obtain the data and generate response message packets containing the requested data for transmission to the host computers 13n which generated the retrieval requests, also for transmission over the communication links and through respective switching nodes 22m of the switching fabric 15. Similarly, to enable data to be stored in the mass storage subsystem 11, the host computers generate message packets containing data storage request, including the data to be stored, for transmission to the mass storage subsystem 11 over the communication links and through respective switching nodes 22m of the switching fabric 15. After the mass storage subsystem 11 receives the message packets containing the data storage requests, it will provide storage for the data. The mass storage subsystem 11 may also provide response message packets including status information indicating the success or failure of the data storage operation.

More specifically, the message packets including the data retrieval or storage requests are received by the mass storage subsystem's control module 24. In response to a data retrieval request, to obtain the requested data the control module 24 will initiate a retrieval operation to retrieve the requested data from the data store 23 for use in the response message packets. On the other hand, in response to a data storage request, the control module 24 initiates a storage operation in connection with data provided in the data storage request. During these and other operations performed by the mass storage subsystem, if the control module 24 detects errors or other conditions, it can may enable a fault or other status indication to be signaled to the management service center 16 through the console interface 25 and mass storage subsystem console 12. In response to receipt of an indication of a fault or other status indication, the management service center 16 can take corrective action. For example, if a fault or other status indication indicates that a component of the mass storage subsystem 11 has failed or otherwise malfunctioned requiring replacement, the management service center 16 can dispatch a person to implement a repair. Similarly, if a fault or other status indication indicates a problem with programming or microcode controlling the mass storage subsystem 11, the management service center 16 can attempt to generate patch routines to correct the problem. In addition, if a fault or status indication indicates a problem with the mass storage subsystem's configuration or other settings, the management service center 16 can adjust the settings. Other operations that might be performed or enabled by the management service center 16 in response to particular types of fault or other status indications will be apparent to those skilled in the art.

The invention provides an arrangement, including the management server 14, which can provide notifications to the management service center 16, through the mass storage subsystem 11 and console 12, if it detects errors or other conditions in connection with various elements of the network 10, including, for example, the various components of the switching fabric 15 and/or host computers 13n. The management server 14 may also control the signaling of fault or other status indications by the mass storage subsystem 11 in response to errors or other conditions detected thereby. In response to receipt of a notification initiated by the management server 14, the management service center operates in a manner similar to that described above in connection with indications provided by the mass storage subsystem 11. That is, depending on the nature of the error or other condition, the management service center 16 may dispatch a person to implement a repair, attempt to generate patch routines for transmission to the switching node(s) 22m for which the notification was generated, update the configuration of the switching node(s) 22m for which the notification was generated, and the like.

The management server 14 is connected to at least one or selected ones of the switching nodes 22m in the switching fabric 15 to facilitate communications therewith. Communications between the management server 14, on the one hand, and the switching nodes 22m, on the other hand, are by way of message packets, transferred in a similar to the message packets used to transfer data retrieval and data storage requests and responses thereto. It will be appreciated that the management server 14 may not need to be connected to all of the switching nodes 22m in the switching fabric 15, since communications with a switching nodes 22m to which it (that is, the management server 14) is not connected can be effected by transfer of message packets through the switching nodes 22m' (m'≠m) to which it is connected, as well as other switching nodes 22m", ... (m", ... ≠m, m') (if any) between the switching nodes 22m to which it is connected and the switching node with which communications are to take place.

Using periodic polling techniques, well-known SNMP traps, or other techniques which will be apparent to those skilled in the art, the management server 14 can determine when an switching node 22 in has detected an error or other condition in connection with its (that is, the switching node's) operation. Based on predetermined notification policies implemented by the management server 14, in response to detection of the detection of one or more errors and/or other conditions in connection with operation of one or more switching nodes 22m, the management server enables the mass storage subsystem 11 to, in turn, enable a fault or other status indication to be signaled to the management service center 16 through the console interface 25 and mass storage subsystem console 12.

The notification policies used by the management server 14 may be determined by, for example, a system or network administrator, to essentially define filtering criteria which serve to control, for example, the types of errors and/or other conditions for which the management server 14 will enable notifications will be provided to the management service center 16, the number of times or combinations of particular errors and/or other conditions need to be detected in connection with a particular switching node 22m before the management server 14 will enable a notification to be provided to the management service center, and the like. Thus, the management server 14 serves to determine the errors and other conditions of which the management service center 16 will be notified and the rate at which notifications are provided, which can help to limit the number of, and rate at which, notifications are provided to the management service center 16. This will ensure that the management information center 16 is only notified of errors and other conditions for which the system/network administrator has enabled notifications to be provided. In addition, this may provide that not every error or other condition which is reported to the management server 14 will necessarily be signaled to the management service center 16, which can reduce the processing burden on the management service center 16.

The management server 14 may be in the form of a suitably programmed digital computer with network ports to communicate with the various switching nodes or the like communicate with the mass storage subsystem 11 through the switching fabric 15, or over a private link represented by the dashed line identified by reference numeral 27, to enable the mass storage subsystem 11 to generate a fault or other status indication for signaling to the management service center 16 through the console interface 25 and mass storage subsystem console 12. The same communication path, from the management service center 16 through the console 12, mass storage subsystem 11 and either communication link "either communication link 27 or switching fabric 15 to the management server 14, may be used to" 27 or switching fabric 15 to the management server 14, may be used to facilitate the transfer of information from the management service center 16 to the management server 14, including, for example, patches and configuration as described above. In addition, the communication path may be used to facilitate exchanges of information between the management service center 16 and the management server 14 if the management service center 16 needs additional information relating to an error or other condition after receiving notification thereof. After the management server 14 receives such a request from the management service center 16, it can retrieve information from the appropriate switching node 22m.

In one embodiment, communications between the management server 14 and the mass storage subsystem conform to SCSI (Small Computer System Interface) protocol, running over the aforementioned Fibre Channel protocol. That is, messages packets conforming to the Fibre Channel protocol include, as data, message packets which conform to the SCSI protocol. In that embodiment the management server 14 either (i) makes use of a SCSI "write buffer" command to provide data to, or (ii) makes a SCSI system call to enable, enable the mass storage subsystem 11 to provide a notification through the console 12 to the management service center 16 of an error or other status condition in connection with a switching node 22m.

The invention provides a number of advantages. In particular, the invention provides an arrangement, providing a single facility, including the management server 14, for obtaining information as to failures and other malfunctions in connection with various components in the network 10, filtering them, and enabling indications of those that pass the filter to be reported to the management service center 16 at an external site.

It will be appreciated that numerous modifications may be made to the network 10. For example, although the various elements of the network have been described as communicating using particular protocols, in particular the Fibre Channel and SCSI protocols, and various media, it will be appreciated that other protocols and media can be used. In addition, although the invention has to been described in connection with particular SCSI system calls and commands, it will be appreciated that other system calls, commands and communication mechanisms can be used.

In addition, although the invention has been described in terms of failures and other malfunctions in connection with the switching nodes 22m, it will be appreciated that it may also be used in connection with failures and other malfunctions and problems in connection with operation of other elements in the network, including, for example, the host computers 13n and, in particular, applications 20 processed thereby. For example, if a problem develops in connection with processing by a host computer 13n of an application 20, the host computer 13n can notify the management server 14 through the switching fabric 15, which, in turn, can notify the management service center 16 through the mass storage subsystem 11 and console 12 as described above. As with operations in connection with the switching nodes 22m, the management service center 16 can attempt to diagnose the problem in connection with the problem with application 20 and initiate corrective actions, which may include, for example, dispatching a person knowledgeable about operation of the application 20, providing a patch routine or updated configuration information, and the like. The management server 14 can be connected for communications directly to the host computers 13n, or alternatively communications between the management server 14 and the host computers 13n may be by means of message packets transferred through the switching fabric.

It will be appreciated that a system in accordance with the invention can be constructed in whole or in part from special purpose hardware or a general purpose computer system, or any combination thereof, any portion of which may be controlled by a suitable program. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. A management information transfer system for use in a connection with a network including a mass storage subsystem having a console and at least one switching node, the management information transfer system being for transferring processed management information to a management service center located remotely from the network, the system comprising:

A. a management server that receives management information from said at least one switching node that is directed to at least one failure or other malfunction related to the operation of the at least one switching node, and performs a filtering operation in connection with the management information in accordance with filtering policies that define criteria for which the management server will provide to the management service center;

B. wherein, the management server transfers the filtered management information to the management service center to facilitate diagnosis and possible correction of the at least one failure or other malfunction related to the operation of the at least one switching node in accordance with the filtering polices; and C. an information transfer subsystem that receives the filtered management information from said management server by communicating with the mass storage subsystem over a switching fabric or selectively over a private link whereby the management service center takes corrective action, and thereby enabling the mass storage system to be remotely located from the management service center when it provides the corrective action.

2. A management information transfer system as defined in claim 1 in which said filtered management information to the management service center is transferred over the public telephony system.

3. A management information system as defined in claim 1 in which the mass storage subsystem receives the filtered management from the management server over the network.

4. A management information system as defined in claim 1 in which the mass storage subsystem receives the filtered management information from the management server over a connection separate from said network.

5. A management information transfer system as defined in claim 1 in which said management server polls said at least one switching node to retrieve said management information therefrom.

6. A management information transfer system as defined in claim 5 in which said management server polls said at least one switching node over the network.

7. A management information transfer system as defined in claim 1 in which said management server receives said management information in connection with an SNMP trap.

8. A management information transfer system as defined in claim 7 in which said management server receives said management information over the network.

\* \* \* \* \*